United States Patent [19]
Buschbom

[11] 3,822,796
[45] July 9, 1974

[54] DIFFERENTIAL AUGER MATERIAL COLLECTOR

[75] Inventor: Floyd E. Buschbom, Long Lake, Minn.

[73] Assignee: VEDA, Inc., Long Lake, Minn.

[22] Filed: Nov. 24, 1972

[21] Appl. No.: 309,520

[52] U.S. Cl. .......................................... 214/17 DB
[51] Int. Cl. .......................................... B65g 65/46
[58] Field of Search ................... 214/17 DB; 302/56

[56] References Cited
UNITED STATES PATENTS 3,143,378  8/1964  James et al. ............... 214/17 DB X
3,547,283  12/1970  Beebe et al. ..................... 214/17 DB

*Primary Examiner*—Robert G. Sheridan

[57] ABSTRACT

A surface or top silo unloader of the type having leading and trailing counter-rotating augers for gathering material to the center of the silo and delivering it to an impeller which discharges the material from the silo. The trailing auger has a diameter greater than the leading auger and operates at a slower rate of speed. The augers have outwardly projected knives for cutting the material.

16 Claims, 3 Drawing Figures

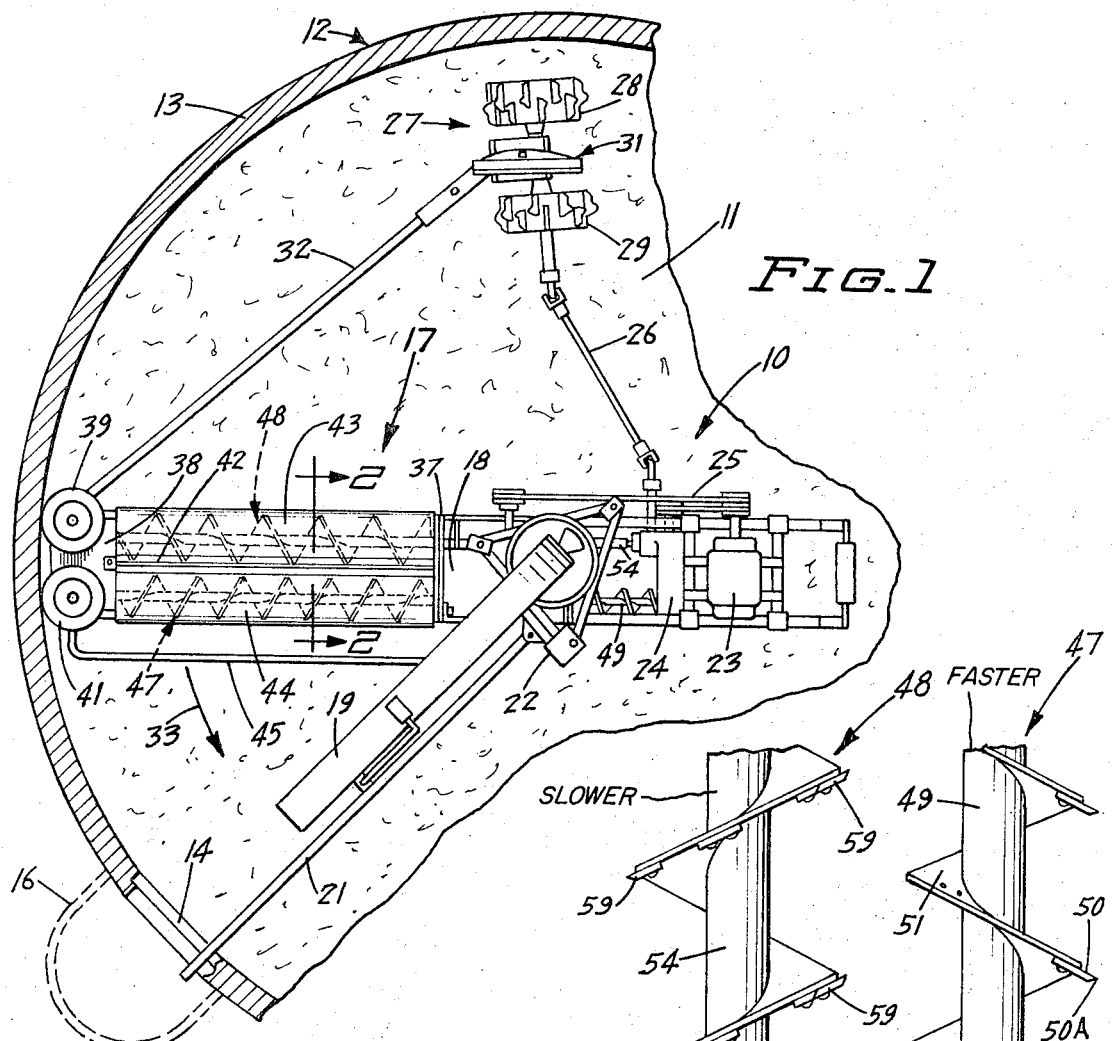
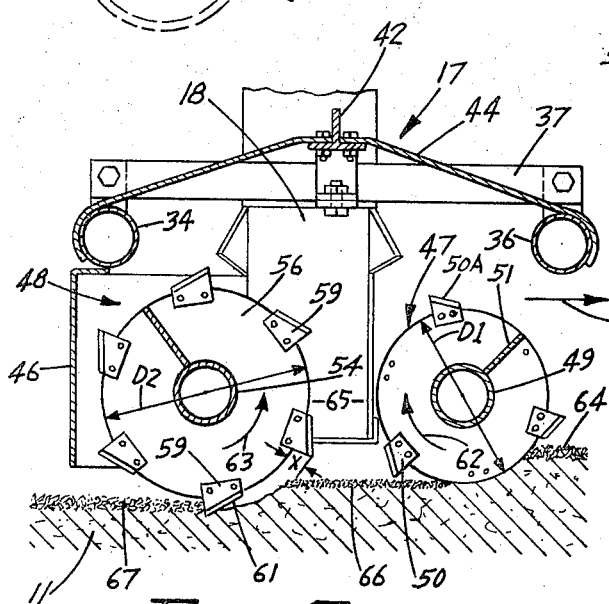
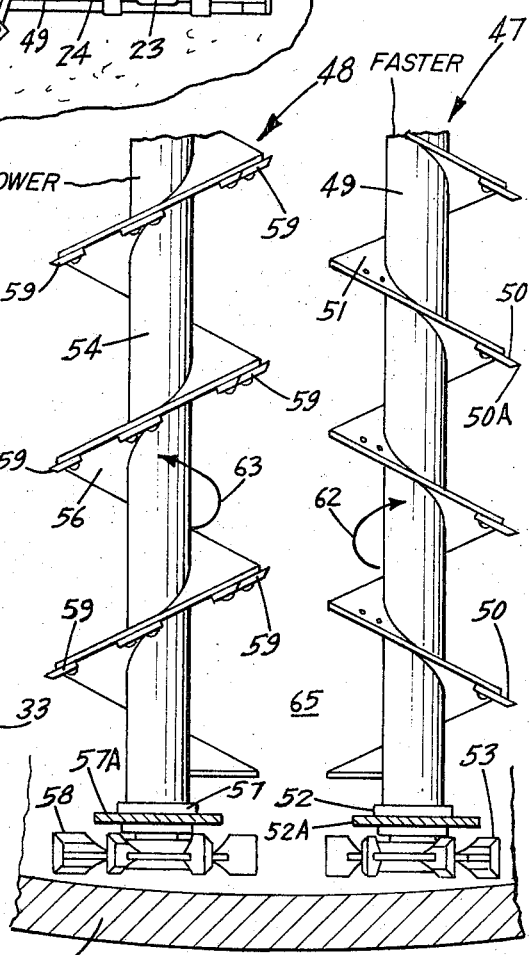

DIFFERENTIAL AUGER MATERIAL COLLECTOR

BACKGROUND OF INVENTION

Top unloading silo unloaders are used to remove silage from the top of a silo to the discharge chute which leads to the base of the silo. Examples of these silo unloaders are disclosed by Buschbom in U.S. Pat. Nos. 3,301,412 and 3,522,971. These unloaders have a pair of augers which rotate at the same rate of speed to move the material to an impeller which moves the material into a discharge chute, directing the material from the silo. The helical flights of the pair of augers have the same diameter and are rotationally timed relative to each other to avoid restrictions which impede the flow of material to the impeller. Knife structures have been used with the helical flights of augers to aid in cutting material stored in a silo. Examples of knife structures are shown by Van Dusen in U.S. Pat. No. 3,019,015 and Hansen in U.S. Pat. No. 3,451,566. The use of knives in collecting augers in a silo unloader improves the cutting characteristics of the augers but has only minimal effect on the feeding characteristics of the augers. Material stored in silos varies in density and toughness from light to very hard. These materials include grass and corn ensilage and haylage. In many cases, the material may even be frozen. The material stored in silos can vary in hardness and have hard, dense areas. The silo unloader has to cope with a relatively light material and compressed hard material, with the result that there may be clogs or pads of material that can block or obstruct the unloader and thereby reduce its capacity.

SUMMARY OF INVENTION

The invention relates to a material handling apparatus or machine for removing material, as silage, haylage and the like, from a storage area. More specifically, the invention is directed to a top unloading silo unloader having a pair of augers to collect and convey material to a discharging means. The first auger is a forward or leading auger located in front of and generally parallel to a second or trailing auger. The first auger has a diameter that is smaller than the second auger. The first auger is rotated at a speed greater than the speed of the second auger. This eliminates the timing of the auger flights as required in prior silo unloaders. The second auger is provided with a plurality of outwardly projected knives which cut the material during rotation of the auger. The first auger may also have outwardly projected knives. Drive means rotate the first and second augers in opposite directions at different rates of speed, whereby the material is evenly conveyed by the augers to the discharge means.

The differential in size and speed between the first auger and second auger eliminates the timing of auger flights and provides for a smooth material flow and greater capacity of material to the discharge means.

The collecting augers resist the movement of the unloader around the silo. The drive hubs force the collector assembly against the silo wall as they move the collector assembly around the silo. The agressiveness of the leading or first auger aids the movement of the unloader around the silo without reducing the pressure of the collector on the side wall. This agressiveness is controlled by the size and speed relationship of the leading auger relative to the trailing auger. The machine can operate in all types of material from soft to hard and is not affected by hard or compressed spots in the material in the silo.

IN THE DRAWINGS:

FIG. 1 is a plan view of a top silo unloader located in a silo having material stored therein;

FIG. 2 is an enlarged sectional view taken along line 2—2 of FIG. 1; and

FIG. 3 is an enlarged plan view of the outer end sections of the leading and trailing augers of the unloader of FIG. 1.

Referring to the drawings, there is shown in FIG. 1 a top silo unloader indicated generally at 10 located on top of material 11, as ensilage, haylage and the like, stored in a conventional tower silo 12. The tower silo 12 has a cylindrical upright wall 13 having vertically aligned openings or doorways 14 open to an upright chute 16.

Silo unloader 10 is of the type shown in U.S. Pat. Nos. 3,522,971 and 3,289,863. Unloader 10 has an elongated material collector 17 operable to collect material and move the material to a centrally located impeller 18. Impeller 18 is of the type disclosed in U.S. Pat. No. 3,589,500. Other types of impellers or material moving means can be used to transfer the material received from the collector 17 to an out or discharge chute 19. The impeller 18 is operable to receive the material from collector 17 and discharge the material into the discharge chute 19. Chute 19 directs the material through the openings 14 into the silo chute 16 which delivers the material to the base of the silo. A torque arm 21 connected at its inner end to a suspension ring assembly 22 extends through a door 14 to maintain the discharge chute 19 in alignment with the door 14 and hold the suspension ring assembly 22 in a non-rotating relationship relative to the remaining portions of the unloader. A cable (not shown) connected to suspension ring assembly 22 pendently supports the unloader in the silo. An example of the pendent support is disclosed in U.S. Pat. Nos. 2,995,260 and 3,217,907.

Unloader 10 has a power unit or electric motor 23 which drives a transmission or gear box 24 and rotor of the impeller through a belt drive 25. The transmission 24 drives a drive shaft 26 connected to a drive wheel assembly 27. Drive wheel assembly 27 comprises a pair of drive wheels 28 and 29. Located between drive wheels 28 and 29 is an adjustable connector assembly 31 joined to a tie bar 32. Bar 32 extends in a forward direction and is connected to the outer end of the collector 17. Wheels 28 and 29 and connector assembly 31 are of the type shown in U.S. Pat. No. 3,522,971 and U.S. Design Pat. No. 212,779. Operation of drive wheel assembly 27 moves the collector 17 in a forward direction in the silo, as indicated by arrow 33 and forces the collector outwardly into pressure engagement with side wall 13.

Referring to FIGS. 1 and 2, collector 17 comprises a pair of elongated parallel frame members 34 and 36 extended the full length of the unloader. The frame members 34 and 36 are braced at suitable intervals. The bracing includes cross member 37 located adjacent impeller 18 and an outer end plate 38. Wall engaging guide wheels 39 and 41 are journaled on plate 38 for rotation about separate vertical axes. The wheels 39 and 41 engage the inner surface of silo wall 13 and guide the unloader in its travel within the silo. Midway between frame members 34 and 36 is an elongated T-bar 42 adapted to receive a counterbalancing weight (not shown). The top of collector 17 is closed with top shield members 43 and 44 located on frame members 34 and 36 and secured to T-Bar 42 with conventional bolts. Located forwardly of the front frame member 36 is a guard rail or rod 45. As shown in FIG. 2, a downwardly directed rear wall or shield 46 is located below the frame member 36. The top portion of shield 46 is a generally horizontal flange that is secured to frame member 36. The shield 46 is an elongated sheet member that extends linearly along the rear side of the collector 17.

Located below frame members 34 and 36 and generally parallel thereto are a pair of elongated rotary means indicated generally at 47 and 48 operative to collect and convey material in a generally linear path inot impeller 18. The rotary means 47 and 48 are positioned generally parallel to, each other with a space 65 between the rotary means being unobstructed. Rotary means 47 is a first or leading auger having an elongated center shaft 49 and a continuous helical or spiral flight 51 concentric with the shaft and secured thereto. The outer end of shaft 49 is journaled in a bearing 52 carried in a downwardly projected leg 52A secured to the plate 38. Attached to the outer end of shaft 49 is a wall cleaner or cutter 53. The inner end of leading auger 47 is located in front of the impeller 18 and has a short length of reverse flighting to move material from the center into the impeller. The inner end of shaft 49 is connected to a first drive or output shaft of gear box 24.

The rotary means 48 is a second or trailing auger having an elongated center shaft 54 carrying a continuous spiral or helical flight 56. The outer end of shaft 54 is mounted in bearing 57 carried in a downwardly projected leg 57A secured to plate 38. A wall cleaner or cutter 58 is attached to the end of shaft 54. Wall cleaners 53 and 58 have a plurality of cutting teeth and can be reversibly mounted on shafts 49 and 54. Examples of wall cleaners are shown in U.S. Pat. No. 3,651,960. The inner end of shaft 54 is connected to a second drive or output shaft of gear box 24.

As shown in FIGS. 2 and 3, a plurality of circumferentially spaced knives 50 are secured to the outer peripheral edge portions of the helical flight 51. Each knife has an inclined cutting edge 50A that slopes in a forward and radially inward direction with respect to the direction of rotation of the auger 47. Flight 51 has a plurality of pairs of circumferentially spaced holes to accommodate fasteners, as bolts, rivets and the like, to attach additional knives to the flight. The number of knives 50 used on the flight 51 can be changed according to the characteristics of the material and the amount of agressiveness required of the leading auger. The trailing auger 48 has spaced knives 59 secured to outer peripheral edge portions of the helical flight 56. Each knife 59 has an inclined cutting edge that slopes in a forward and radially inward direction relative to the direction of rotation of auger 48.

As shown in FIG. 1, center shaft 49 of the leading auger 47 is attached to a first drive shaft of gear box 24. Center shaft 54 of trailing auger 48 is also attached to a second drive shaft of gear box 24. On operation of the gear box 24 by the motor 23, the augers are driven in opposite directions, as shown by arrows 62 and 63 in FIGS. 2 and 3. The leading auger 47 is rotated faster than the trailing auger 48. Augers 47 and 48 are supported by bearings 52 and 57 and the gear box 24 for rotation about separate generally parallel axes. The rotational axes are spaced from each other and are located in a generally horizontal plane.

As shown in FIG. 2, the diameter D1 of the leading spiral flight 51 is smaller than the diameter D2 of the trailing flight 56. The knives 59 extend a distance X beyond the outer peripheral edge of flight 56. The gear box or transmission 24 operates to drive the leading auger 47 faster than the trailing auger 48. The leading auger turns at least 50 rpm faster than the trailing auger. The speed ratio between the leading auger 47 and the trailing auger 48 is approximately 4:3. Other speed ratios of augers 47 and 48 can be used in the operation of the unloader.

An example of one embodiment of the collector is as follows. The leading auger 47 has a diameter D1 of 7 inches and rotates at approximately 275 rpm. Trailing auger 48 has a diameter D2 of 8 inches. The effective height of the knives 59 is 1 inch. The effective diameter of the trailing auger is increased by 2 inches because of knives 59. The trailing auger 48 is rotated by gear box 24 at approximately 200–205 rpm. Augers 47 and 48 are rotated in counter-rotating directions in the direction of arrows 62 and 63.

The differential in size and speed between the leading auger 47 and trailing auger 48 eliminates the requirement that the auger flights be rotationally timed. The difference in auger sizes and speeds provides the unloader with a smooth material flow and increases the capacity of the unloader. When used in tough material, the capacity of the unloader is increased about 25 per cent over a conventional unloader. The leading auger 47 is more aggressive and breaks up pads of tough material, such as commonly found in haylage. The aggressiveness of the leading auger 47 is a functional relationship between its size, speed and the number of knives 50. The aggressiveness of the leading auger, which rotates faster than the trailing auger, provides substantially constant pressure of wheels 39 and 41 on wall 13 and an even flow of material to impeller 18. The result is a substantial increase in the unloading capacity of the unloader. The collector 17 also increases the pressure of wheels 39 and 41 on wall 13 and maintains a continuous straight and steady stream of material into the impeller 18. The rear auger 48, being larger, functions as the main conveyor and takes a greater part of the load. The knives 59, being located on the rear auger, are more effective in cutting and breaking up the material 11.

In operation, the collector 17 moves around the silo wall in the direction of arrow 33. The leading auger 47 engages the initial layer of material, including loose top material 64. This material is moved in the space 65 between augers 47 and 48. Leading auger 47 makes a first cut at an intermediate working depth indicated by line 66 in FIG. 2. The trailing auger 48, being larger than leading auger 47, makes a second or additional cut in the material 11 which is below the level of line 66. The knives 59 dig into the material 11 and leave a layer 67 of loose material behind the collector 17. Augers 47 and 48 concurrently cooperate with each other to move the material in the space 65 in a continuous straight line direction into impeller 18.

It is apparent that modifications and variations of the material collector described and shown may be made by those skilled in the art without departing from the invention. Also, the collector can be used to handle material other than ensilage and haylage sotred in a silo. The invention is defined in the following claims.

The embodiment of the invention in which an exclusive property or privilege is claimed are defined as follows:

1. A material collector means for a material handling apparatus having a discharge means for moving material comprising: first leading auger means and second trailing auger means located behind and generally parallel to the first auger means for moving material toward the discharge means, said second auger means having a diameter greater than the diameter of the first auger means, outwardly projected knives secured to the second auger means, and drive means for rotating the first and second auger means in opposite rotational directions, said drive means operable to rotate the first auger means faster than the second auger means.

2. The collector means of claim 1 wherein: the first auger means has a continuous spiral flight.

3. The collector means of claim 2 wherein: the second auger means has a continuous spiral flight larger in diameter than the spiral flight of the first auger means, said knives being secured to outer portions of the flight of the second auger means.

4. The collector means of claim 1 wherein: the drive means rotates the first auger means in the rotational direction which moves the collector means in the forward direction.

5. The collector means of claim 1 wherein: the first auger means is longer than the second auger means.

6. The collector means of claim 1 wherein: said drive means operates to rotate said first and second auger means at a speed ratio of approximately 4 to 3 respectively.

7. The collector means of claim 1 including: means to rotatably support the first auger means and the second auger means about separate generally parallel axes, said axes being spaced from each other and located in a generally horizontal plane.

8. The collector means of claim 1 wherein: the trailing auger means has a diameter at least 1 inch greater than the diameter of the leading auger means.

9. The collector means of claim 1 wherein: the leading auger means is rotated at least 50 rpm faster than the trailing auger means.

10. The collector means of claim 1 wherein: the trailing auger means has a diameter at least 1 inch greater than the diameter of the leading auger means, and the leading auger means is rotated at least 50 rpm faster than the trailing auger means.

11. The collector means of claim 10 wherein: the trailing auger means has a diameter of at least 8 inches and is rotated about 200 rpm.

12. The collector means of claim 10 wherein: the knives each have a forwardly and inwardly inclined cutting edge.

13. The collector means of claim 1 wherein: the knives each have a forwardly and inwardly inclined cutting edge.

14. The collector means of claim 1 wherein: the leading auger means is rotated at least 270 rpm and the trailing auger means is rotated at least 200 rpm.

15. The collector means of claim 1 including: a plurality of outwardly projected knives secured to the first auger means.

16. The collector means of claim 15 including: means on the first auger means whereby a selected number of knives can be secured to the first auger means.

* * * * *